Figure 1:
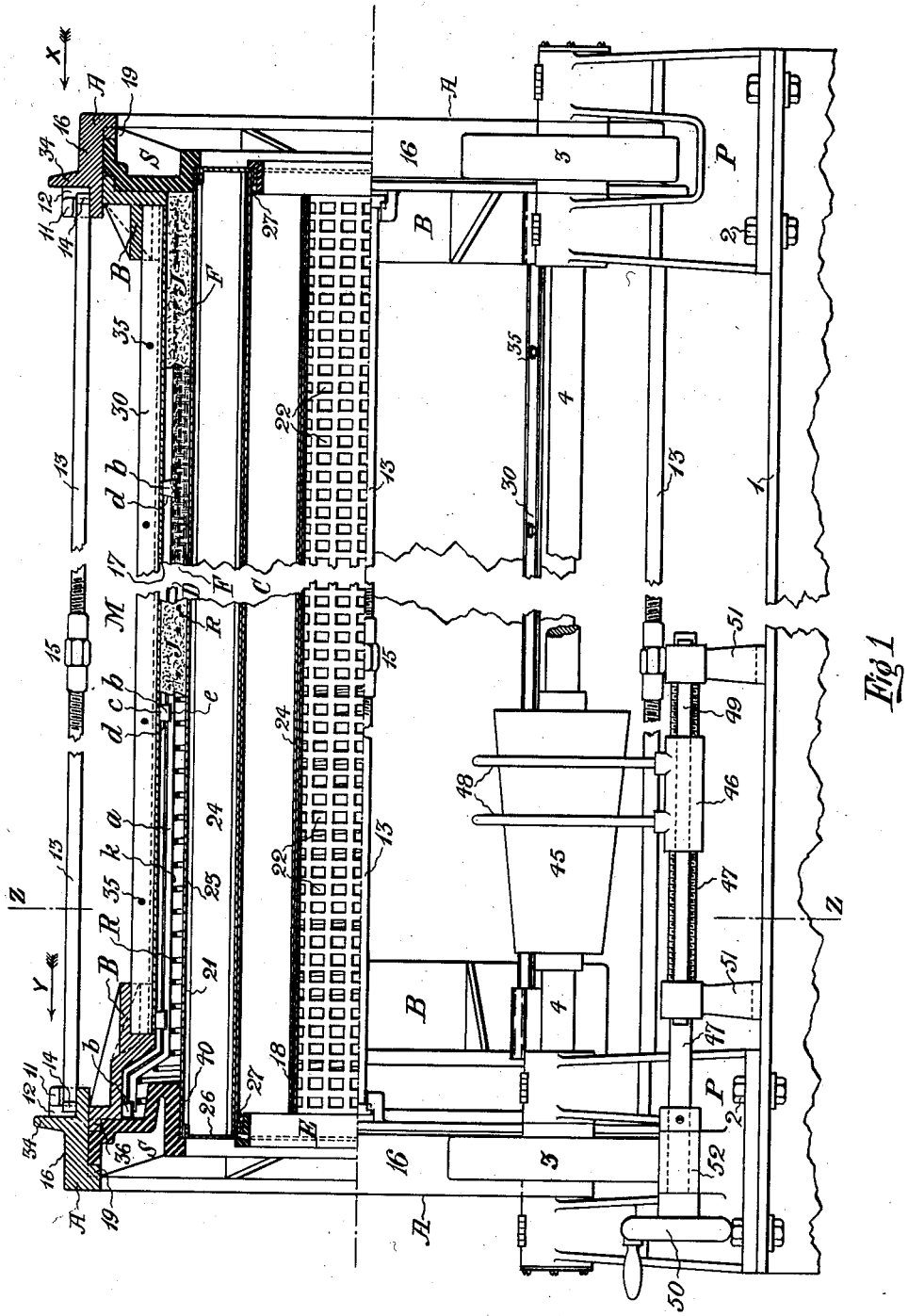

Mar. 3, 1925.  
C. W. WATSON  
1,528,518  
PROCESS AND APPARATUS FOR MAKING CONCRETE STRUCTURES CENTRIFUGALLY  
Filed Dec. 27, 1923  
2 Sheets-Sheet 2

Charles William Watson

Patented Mar. 3, 1925.

1,528,518

UNITED STATES PATENT OFFICE.

CHARLES WILLIAM WATSON, OF ST. KILDA, VICTORIA, AUSTRALIA.

PROCESS AND APPARATUS FOR MAKING CONCRETE STRUCTURES CENTRIFUGALLY.

Application filed December 27, 1923. Serial No. 682,996.

*To all whom it may concern:*

Be it known that I, CHARLES WILLIAM WATSON, a subject of the King of Great Britain and Ireland, residing at 1 York Street, St. Kilda, in the State of Victoria, Commonwealth of Australia, have invented certain new and useful Improvements in Processes and Apparatus for Making Concrete Structures Centrifugally; and I do hereby declare the following to be a full, clear, and exact description of the invention, such as will enable others skilled in the art to which it appertains to make and use the same.

My invention relates to the process of centrifugally manufacturing structures of reinforced or plain plastic material hereinafter for brevity termed concrete, inclusive of structures—of oval or oviform cross section—hereinafter for brevity referred to as structures of irregular contour. I believe that satisfactory reinforced structures of irregular contour such as I produce have not previously been made by centrifugal process. The reinforcement in the structures I make does not become displaced or deformed during the centrifugal action, but becomes embedded in predetermined position in the concrete of the structure. These structures are usable in sewer making, but are not thereto limited. My invention also relates to apparatus for conducting the said process.

By reinforcement I include in this specification meshed, woven, or expanded metal, or wire. When I include wire having convolutions these are suitably spaced by helical winding. Reinforcing bar members are at will embedded in the concrete also.

In this specification all cementitious material is referred to as concrete; the term retainer refers to any member I employ of bar form which becomes retained in the centrifugally made structure, and which preserves the spacing of reinforcement; the term ferruginous is used to mean iron, steel, or other suitable metal; the term irregular form is used to indicate the form of any concrete structure I make which is not symmetrical round its axis of rotation, but tubular structures are occasionally herein referred to as pipes; and the term mould refers to an outer configuring element, distinguishing it from an inner configuring element which is termed a core.

To carry this invention into effect I employ rotary moulding mechanism, for brevity called a rotor; and framing with power transmitting mechanism for brevity called a stator. In the process of manufacturing a structure of irregular contour centrifugally the axis of rotation is not diametrically central, but the apparatus used should conduce to substantially correct balancing of the rotated mass; and I ensure adjustment of the balance, by providing on the mechanism a balancing mass or masses. The structures I make may vary but they include features herein described. Each structure has ends of any desired contour, for jointing, for example.

I illustrate in the accompanying drawings an apparatus for the use of my invention, but modified apparatus could be used while keeping within the scope of my claims.

In these drawings like reference characters show corresponding parts.

Figure 2:
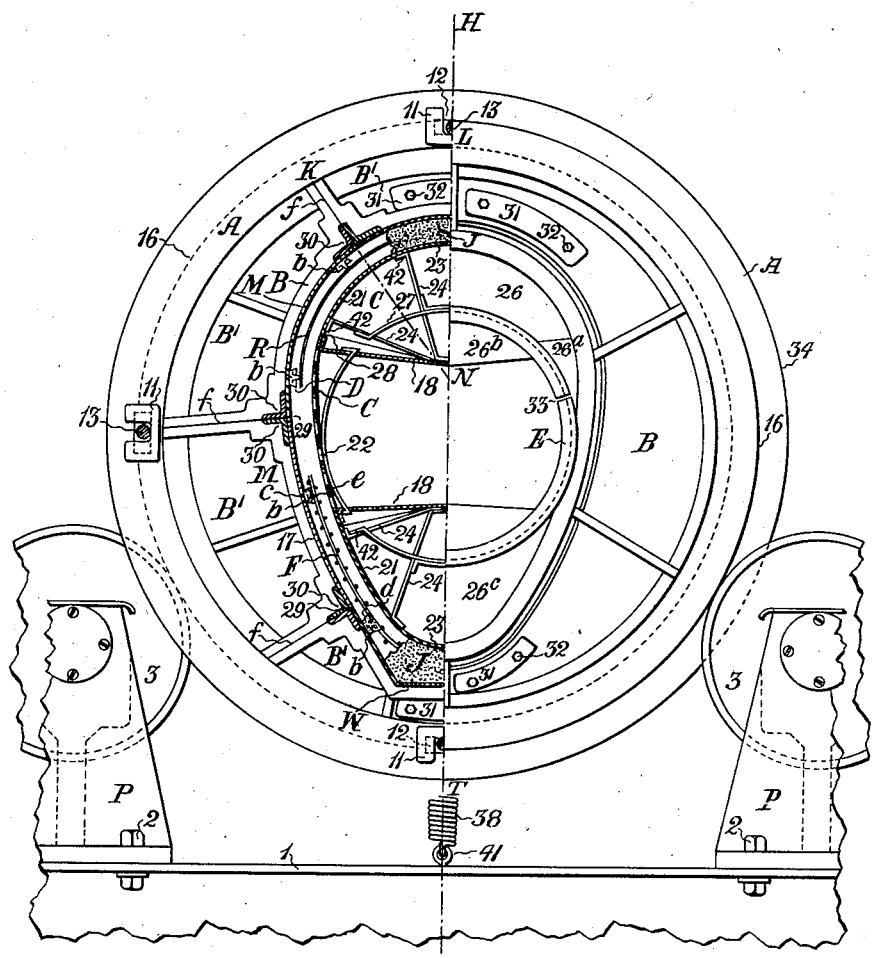

Figure 1 is an elevation—partly sectional—about on the lines H, L, K, N, and towards T, of Figure 2, and shows a centrifugal machine for moulding an oviform pipe having respective spigot and faucet ends, parts of the pipe being shown. At one side of the vertical break in this figure, the reinforcement shown consists of coiled wire and retainers; at the other side it consists of meshed or expanded metal.

Figure 2 is in part an elevation, viewed in the direction of arrow X of Figure 1, and is in part a sectional elevation, viewed in the direction of arrow Y and taken on line Z—Z of Figure 1 but omitting striking gear. There are parts of the concrete structure shown, retainers and coiled wire being illustrated at the upper part of the figure, and meshed metal at the lower part. Where two kinds of reinforcement are shown in one figure it is done to minimize the drawing.

Figure 3:
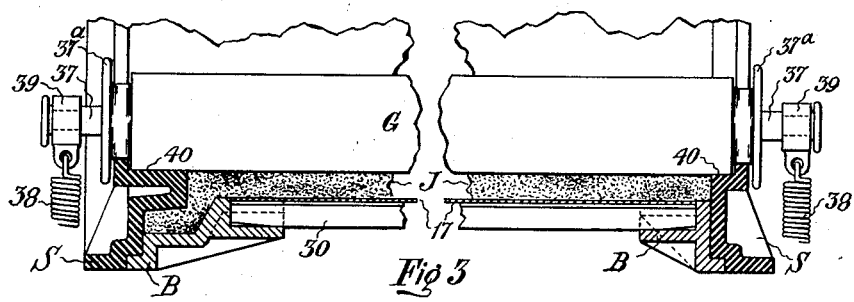

Figure 3 is a longitudinal sectional elevation on line N—T of Figure 2, showing part of the mould containing a smoothing roller which acts upon concrete, which has been centrifugally located, and is shown without reinforcement.

My retainers are longitudinal bars D shaped to meet requirements. Any desired retainer is provided with locking surfaces to co-operate with concrete employed in fabricating the structure. When bars D are employed the reinforcement is positioned thereby, contacting with any bar surface convenient, and attached thereto as desired as by wiring or welding.

In Figure 1, member *a* is shown crank ended to enable a faucet to be moulded, the other end of the retainer being straight to allow of forming a spigot.

My retainers include a basic ferruginous member *a* carrying distance members or blocks of concrete *b* and in some of these retainers a relatively large area of the basic member (apart from that occupied by the blocks *b*) will be exposed to contact with and adhere to the concrete which will be added to form the desired structure. Each block *b* is of any suitable form and cross section, clinging to the basic member. A block *b* is located at each end of any retainers of reinforcement desired to prevent longitudinal movement relatively to the mould, in relation to which the retainers are positioned so that the reinforcement will be embedded in predetermined position in the structure to be made containing also the retainers. The latter can impart such strength to structures as to enable relatively long structures to become wholly or largely self-supporting on girder principles.

Whether helically coiled wire is employed forming the reinforcement R, or meshed or expanded metal F is employed as reinforcement without using bars D, it is positioned relatively to the mould face and/or the core blocks *b*, or the equivalent, moulded on or suitably attached. Such blocks are arranged externally of the reinforcement to contact with the mould, or internally to contact with the core, or at both sides of the reinforcement. The blocks are when desired positioned on intersections of the meshed or expanded metal. The block surfaces *c* contact with a mould face, and may correspond in contour with the said face for assembly and seating purposes.

The blocks *b* have locking surfaces *d* to oppose displacement by centripetal, centrifugal, or longitudinal stresses when structures containing them are being formed. A retainer surface in contact with reinforcement is shown flat at *k*, but the surface can have notches or serrations to enable it to grip wire reinforcement and prevent the latter creeping or spreading. The retainers have surfaces for contact with wire reinforcement R, or metal fabric F which is diagrammatically illustrated; members *b* forming distance pieces or seating blocks assisting to position the reinforcement in the structure to be made.

In Figure 1 the reinforcement encloses a withdrawable core, and blocks *b* superpose the reinforcement, forming therewith a cage which is inserted within the mould M, the surfaces *c* of the blocks *b* contacting with the mould interior as aforesaid.

The stator bed 1 carries pedestals P adjustably secured by bolts 2 passing through selected holes in the framing, series of such holes extending transversely and longitudinally so that rotors of different dimensions may be used. The pedestals carry rollers 3. If desired additional adjustable rollers (not shown) could be used for safety purposes.

At each end of the rotor is an annulus A each having any suitable form and shown with a flange 34, and a circular periphery 16 bearing against rollers 3. The rotor is frictionally driven by a pair or pairs of rollers 3 which are carried by a shaft 4 having driving means for fast, and, at will, other rotation.

In Figure 1, 52 is a bracket and 51 are standards and these carry bearings through which extends a partly screw threaded shaft 47, having an operating hand wheel 50. Guide bars 49, one on each side of shaft 47, are mounted also in standards 51.

The striking gear includes a carrier 46 bored for the said bars 49 and screwthreaded for the shaft 47, the carrier having a fork 48 for moving the belt (not shown) over a cone pulley 45, the shaft screw holding the fork in desired position. This cone drive admits of speed variation without shock to the rotor and consequently without undue molecular disturbance of the concrete, but I could use other suitable driving mechansm.

Each annulus A is provided with a series of housings 11 (see Figures 1 and 2) formed each with a recess chamber 12 to receive and hold an enlarged head 14 at the end of a tie bar 13, which is formed in portions having respective right and left hand threads engaging a draw nut 15.

For the centrifugal production of an oviform pipe, I provide a mould shell 17 shown of irregular contour to each end of which a configuring carrier B, see Figure 1, is secured (as by rivets not shown) the shell and carrier being formed of segments or arcs (any of which are ornamental) or the shell is in one piece when desired and capable of expansion for removal.

The segments are shown with meeting edges *f* and angle irons 30 along them, connected to carrier segments $B^1$. The carriers are shown formed of segments $B^1$, but each may be in one piece recessed to house the mould shell. Longitudinal edges of mould segments are shown butt jointed at 29, and stiffened with the angle irons 30. Bolts and nuts 35 or the like secure the parts together. Mould shell 17 configures or produces the external design of the concrete structure, and is at will sectioned longitudinally. Configuring parts may be employed where desired to produce ornamental structures.

At each end of the mould I locate a configuring element S which forms the structure end. An element S and an adjoining annulus A may constitute one piece. Element S has a surface 40 with which shell 21 of core C contacts; this surface is (see Figure 3) when the core is removed usable as a guide and gauge for any scraper, smoother, and/or finishing means which may be used, and surface 40 may determine the thickness of the concrete structure.

Each element S may have clutching lugs 19 locking in recesses in the annulus A, and each carrier B may have clutching lugs 36 locking in recesses in element S, but instead of using the latter lugs, lugs may extend radially from carriers B to embrace housings 11, and thus lock each annulus A to a carrier B.

I could employ as a core a shell of sheet material (not illustrated) which will when required be contracted centripetally to facilitate installation and removal, its edges being of any suitable form suitably connected and secured together, but as shown in Figure 2 the core C includes a segmented shell 21, of egg shape, that is of irregular contour. It is shown in four portions (though not limited thereto) that is two opposite unperforated portions each marked 23, and, between these, two opposite perforated portions 22, each of which will be in practice of suitable size, form, and location. Parts of the portions 22 need not be perforated.

The meeting edges 28 of the core arcs have any satisfactory joints. Any suitable stays or plates 24 are usable by which core arcs are stiffened to withstand stresses, these being shown with end flanges 42 secured to the arcs. Each core end is fitted with curved members 27 shown at the top, bottom and intermediately which form a seat for locking ring E which is capable of diametral contraction and expansion, being gapped as at 33, the ring E on being set in place holding the core segments securely against the surfaces 40 of element S. The locking means may vary, but I prefer spring expansion rings. I form this core shell when desired in sections longitudinally to facilitate making elongated shells.

I have found by experiment that to make a tubular body of irregular contour it is advantageous to employ directors of the supply of concrete, the directors being positioned to limit the area or areas within the core reached by the concrete prior to its passing outward of the core. Thus 18 are two director plates, forming a chamber within which is the centre of rotation. These directors shut off opposite portions of the core interior from the concrete supplied, the perforated parts of the core through which the concrete will pass into the moulding space being at opposite parts of this chamber. I provide also core end closing plates shown as 26, 26ª, 26ᵇ, and 26ᶜ, but their number and form may vary, to prevent concrete being fed between the directors and the core portions 23, and thus prevent objectionable changes of rotational equilibrium.

Although I do not limit the positions of director plates, or of core perforations to those illustrated I do provide considerable circumferential lengths or arcs of moulding space which are bounded outwardly by the mould and inwardly by unperforated portions of the core; and these arcs or lengths necessarily become filled with concrete which to some extent travels from perforated areas circumferentially, the latter areas being relatively far apart. Core apertures could be located at diametral extremities of any suitably located concrete receiving chamber similar to that illustrated.

In centrifugally moulding a structure of irregular contour the elements of the rotary system should be associated so that they rotate in equilibrium (or substantially so as absolute equilibrium may not be feasible under all conditions). In many instances the centre of balance of a structure of irregular contour does not coincide with its diametral centre. The objective is practically obtainable by so positioning the moulding portions of irregular contour (relatively to regularly contoured portions and elements of the system) that the centres of balance of the various rotatable elements are brought into workable agreement, or substantially so. Practical balance may be secured, or adjustment effected, by providing in a convenient location a movable mass or masses secured by approved means. I illustrate diagrammatically in Figure 2 such masses 31 fixed on the rotor by bolts 32. The structure illustrated has a flat base W, to which the invention is not limited.

To smooth the inner face of a concrete structure the means shown in Figure 3 may be employed, that is a rotary element as roller G with guide flanges 37ª and shaft 37. This roller by its pressure, which is adjustable, in the case illustrated by tension of springs 38 (carried by axle shackle 39 and adjustably anchored at 41 to frame 1), exerts pressure on the concrete J; and, on rotation of the structure, smooths it; additional surfacing material may be added at will. For forming a smooth inner face on the structure additional concrete may be added in a suitably fine condition and rolled by roller G, inequalities of the structure surfaces being removed. Roller G may be driven by gear from a roller 3, at any desired speed in any suitable direction. For abrading or grinding purposes a suitable rotary element may be installed instead of roller G. For installment, removal, or adjustment purposes, I provide on any core or mould any desired rings, hooks, holes, or the like.

To operate this invention with the illustrated mechanism the procedure is as follows and it will thereupon be obvious how to operate the invention when modifications are adopted. Mould M is closed as by bolts 35. The selected reinforcement (R or F associated when desired with retainers D) is inserted with surfaces c of distance pieces b contacting with the interior surface of the mould, the exterior surface of the core shell, or with both. Elements S, annuli A, core C, and rings E are placed in position, and the heads 14 of bars 13 are inserted in the respective chambers 12 of housings 11. Bars 13 are then tightened by rotating nuts 15, thus drawing annuli A, A, towards each other, and completing the rotor, which is then placed on bearing rollers 3 of the stator; upper or safety rollers if used are placed in contact with the roller path 16. The rotor is then rotated, and concrete is supplied, it passing through perforations adjoining the ends of the director plates, opposed sets of perforations being automatically selected according to the direction of rotor rotation. Any known method is usable for the supply of concrete to the rotor, as a screw conveyor, rotated, advanced, and withdrawn as required, supplied with concrete from any source. The concrete enters the chamber between the director plates 18, and travels over portions of the plates according to the combined effects of rotary motion and centrifugal force, and passes through apertures of parts 22 into the moulding space, where it imbeds the reinforcement (R or F) and the retainers D if used. Displaced air in the moulding space escapes through those perforations of parts 22 which are not occupied by concrete. When the moulding space is substantially filled the speed of the rotor is accelerated to consolidate the concrete, moisture being expelled through available perforations in parts 22, the supply of concrete being continued as required. When consolidation has been completed, ring E and core C are taken off, surplus concrete is removed in any suitable manner, and the internal surface can then be smoothed and finished.

I claim:—

1. The herein described process of centrifugally moulding a hollow article of non-circular cross section, which consists in projecting plastic material from a center of rotation within the article to at least one point of the article nearest the center of rotation, rotating the plastic material about said center, and simultaneously constraining it to move in a direction determined by the shape of the article desired.

2. In the process as claimed in claim 1, the additional step of exerting resilient pressure upon the inside of the moulded article to smooth the inside surface.

3. The herein described process of centrifugally moulding hollow articles, which consists in projecting plastic material from an eccentrically positioned center of rotation within the article, said projection being directed against a rotating mould and in a radial direction toward at least one point of the mould nearest the center of rotation.

4. The herein described process of centrifugally moulding a hollow article of non-circular cross section, which consists in projecting plastic material from a center of rotation within the article, said projection being directed against a rotating mould and in a radial direction toward at least one point of the mould nearest the center of rotation.

5. A centrifugal moulding device for hollow concrete structures, comprising a non-circular mould chamber rotatable about a center within itself, said chamber comprising an outer mould and a hollow configuring core.

6. A moulding device as claimed in claim 5, in which said core has apertures in selected areas to allow the passage therethrough of centrifugally thrown concrete.

7. A moulding device for concrete structures, comprising a rotating mould chamber, the cross section of which is substantially of a shape having at least two points not equidistant from the center of rotation, said chamber comprising an outer mould and a hollow configuring core having apertures in areas located around at least one of the said non-equidistant points nearest to the center of rotation.

8. A moulding device for hollow concrete structures of non-circular cross section, comprising an exterior mould and a configuring hollow core, both adapted to rotate together about a center of rotation within the core, said core having apertures in selected areas to allow centrifugally thrown concrete to pass from the inside of said core into the space between said core and said mould.

9. A moulding device as claimed in claim 8, in which said core is provided with partitions disposed to constitute a chamber enclosing the center of rotation and bounded at its ends by said apertured areas, whereby the concrete is directed in an outward path toward the apertures.

10. A moulding device as claimed in claim 8, including a rotor for carrying said mould and core, and adjustable balancing means carried by said rotor.

11. A moulding device as claimed in claim 8, including a rotor for carrying said mould and core, and adjustable weights carried by said rotor for balancing said rotor.

12. In a centrifugal moulding device for concrete structures, the combination with a base, at least two pair of transversely aligned pedestal bearings adjustable longitudinally on said base, driving rollers carried by said bearings, an annulus supported by and driven by each pair of rollers, a moulding chamber removably carried between said annuli and adapted to be rotated thereby, and means for driving the rollers at desired speeds, of adjustable longitudinal tie bars extending between and carried by corresponding portions of the peripheries of the annuli.

13. A centrifugal moulding device as claimed in claim 12, including configuring end pieces for said chamber carried by said annuli.

14. A centrifugal moulding device for concrete structures, comprising a base, at least two pair of transversely aligned pedestal bearings adjustable longitudinally on said base, driving rollers carried by said bearings, an annulus supported by and driven by each pair of rollers, a moulding chamber removably carried between said annuli and adapted to be rotated thereby, said chamber comprising an exterior mould and a configuring hollow core, and means for driving the rollers at desired speeds.

15. A centrifugal moulding device as claimed in claim 14, including configuring end pieces for said chamber carried by said annuli and having annular shoulders to receive said core, and removable resilient rings adapted to fit inside the core ends to hold the core firmly against the shoulders.

16. A centrifugal moulding device as claimed in claim 14, including configuring end pieces for said chamber carried by said annuli, and means carried by the inside of the core ends for normally holding the end pieces in position.

17. A moulding device for concrete structures of non-circular cross section, comprising a rotating mould, a supporting stator for said mould, a roller extending through the mould, and means carried by the stator for yieldably pressing the roller toward the mould surface whereby the inside of a centrifugally moulded concrete structure may be smoothed.

18. A moulding device as claimed in claim 17 in which said means comprises resilient members interposed between and joining opposite ends of the roller and the stator.

In witness whereof I have hereunto set my hand.

CHARLES WILLIAM WATSON.

Witness:
GEORGE G. TURRI.